United States Patent [19]

Guettler, Jr.

[11] 4,053,174
[45] Oct. 11, 1977

[54] LOAD TRANSFERRING TRAILER HITCH DEVICE

[76] Inventor: Lawrence H. Guettler, Jr., P.O. Box 1695, Montgomery, Ala. 36108

[21] Appl. No.: 720,900

[22] Filed: Sept. 7, 1976

[51] Int. Cl.² .............................................. B60D 1/06
[52] U.S. Cl. ............................. 280/406 A; 280/446 B
[58] Field of Search .......... 280/406 R, 406 A, 446 B, 280/475

[56] References Cited

U.S. PATENT DOCUMENTS

| | | | |
|---|---|---|---|
| 3,445,125 | 5/1969 | Stewart | 280/406 A |
| 3,542,395 | 11/1970 | Millikan | 280/406 A |
| 3,633,939 | 1/1972 | Evernham | 280/406 A |
| 3,778,088 | 12/1973 | Alexander | 280/406 A |

Primary Examiner—Joseph F. Peters, Jr.
Assistant Examiner—R. Schrecengost
Attorney, Agent, or Firm—Newton, Hopkins & Ormsby

[57] ABSTRACT

A jack carried by the draft tongue or A-frame of a trailer supports the front of the trailer during the coupling thereof to the hitch member of a towing vehicle and the jack is also utilized to tension the load transfer members which equalize the load on the wheels of the towing vehicle. Following the coupling and tensioning operations, a retractable engaging member on the jack is connected with a rigid load bearing member on a solid portion of the trailer A-frame which relieves the jack of heavy forces generated by or transmitted through the load transferring members during towing. Safety, convenience, and stability during trailer transport are enhanced by the invention.

16 Claims, 9 Drawing Figures ns trailer hitches are known in the prior art. Such hitches serve to transfer a part of the trailer's hitch weight to the front wheels of the towing vehicle so as to distribute the hitch weight on both the front and rear wheels. The prior art load transferring hitches generally utilize some form of spring means mounted on the towing vehicle which, when tensioned by various mechanical or fluid pressure means on the trailer, produces the desired trailer load distribution on all wheels of the towing vehicle. Most existing load transferring trailer hitches employ either a manual or power-operated device to directly apply the necessary tension to the resilient load transferring means of the towing vehicle and to retain this tension during transport of the trailer. Thus, in the prior art, it is the same device or means which generates the necessary tension in the load transferring means which must maintain this force or tension during towing, despite the fact that the device is subjected to new and often much greater forces generated during towing and transmitted through the resilient load transferring means to the tensioning device. This can result in overloading the tensioning device to such a degree during towing that failure of the mechanism can occur, resulting in a potentially serious accident.

The objective of the present invention is, therefore, to overcome this deficiency of the prior art by provision of a unique means for applying initial tension to the load transferring resilient means during the trailer coupling operation and then transferring the tension loading to a more substantial and rigid load bearing means which is fully capable of withstanding the increased forces and shock loads generated during towing, and simultaneously relieving the initial tensioning means of the dangerous increased forces which it may not be capable of withstanding. In this manner, the safety of the caravan is greatly increased.

SUMMARY OF THE INVENTION

In accordance with preferred embodiments, a built-in power jack means on a solid member of the trailer A-frame is coupled with spring bars extending from the towing vehicle and is operated to apply tension to these spring bars during the operation of coupling the trailer A-frame with the hitch of the towing vehicle. The tensioned spring bars transfer part of the trailer weight on the hitch so the front wheels of the towing vehicle and thus distribute the load.

An engaging member, movable with the foot of the jack, is now rigidly connected with the solid member of the trailer A-frame and the jack is then relieved of its load and the entire load will be carried through the rigid connecting means which is much more substantial than the jack and fully capable of withstanding the increased forces developed during transport of the trailer.

The invention is particularly applicable as an attachment to much equipment already in the field where the trailer jacks are not designed to support the loads, both static and dynamic, which are transmitted through the spring bars or other load transferring means during towing. The invention is also applicable to newly manufactured equipment.

DETAILED DESCRIPTION

Figure 1:
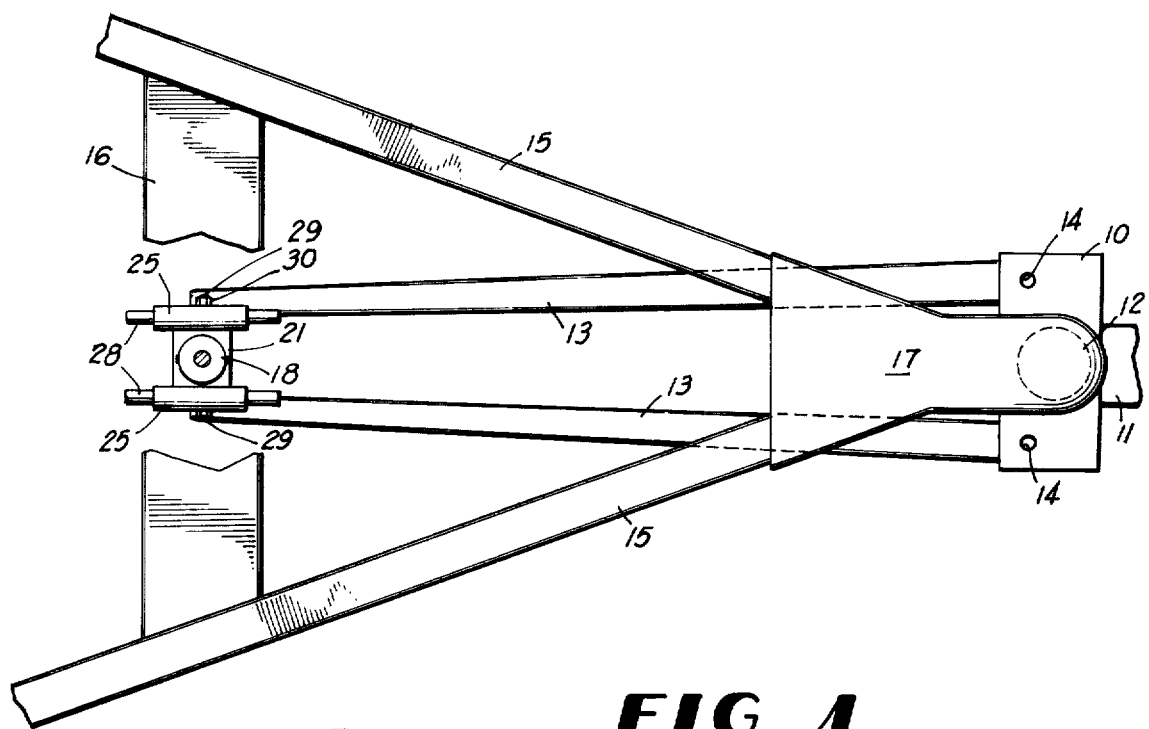
FIG. 1 is a fragmentary plan view of a load transferring trailer hitch embodying the invention, partly broken away.

Referring to the drawings in detail, and referring first to FIGS. 1-5 showing a preferred embodiment, the numeral 10 designates a hitch head which is attached rigidly to the towing vehicle, not shown, by a drawbar 11. A conventional hitch ball 12 is mounted on the head 10 and spaced somewhat thereabove. A pair of load transferring spring arms or bars 13 have their forward ends attached conventionally to the head 10, whereby they may swing horizontally on vertical axis pivots 14 relative to the head 10 but are restrained from swinging vertically on any horizontal axis. The spring arms 13 are adapted to store energy when tensioned, in a manner to be described, and to then transfer a part of the trailer load bearing on the hitch ball 12 to the front wheels of the towing vehicle so that the trailer hitch load will be distributed to all wheels of the towing vehicle. The mechanism thus far described is substantially conventional and a number of similar prior art load transferring trailer hitch devices may be employed with the present invention, one preferred type of hitch being illustrated in the drawings.

A trailer, not shown, has a forward A-frame draft tongue 15 including a sturdy inverted channel cross member 16 rigid therewith and extending transversely between the sides of the A-frame 15. The member 16 is located well rearwardly of a conventional trailer coupler 17 on the forward end of A-frame 15, the coupling 17 being adapted for connection with the hitch ball 12 for universal swiveling relative thereto.

The cross member 16 forms a support for a trailer jack 18 of any preferred type, such as a manual screw jack, having a crank handle 19 at its top. Other types of jacks may be employed, such as hydraulic jacks with pumping means, lever operated jacks, ratchet types, electric powered jacks, and the like. In the illustrated embodiment, the jack 18 has a bottom telescoping foot 20 which, in the absence of the invention, would normally engage the ground when the jack is extended telescopically. In accordance with the invention, an engaging member or sleeve 21 constituting a key element of the invention and being preferably square in cross section, FIG. 1, is engaged loosely-over the lower end of the jack 18 and jack foot 20, FIG. 4, and preferably has a sturdy flat bottom end plate 22 rigidly secured thereto for stable ground contact. A short upstanding interior cylindrical sleeve 23 rises from the plate 22 and is rigidly connected therewith. This sleeve, the rectangular sleeve 21 and the jack foot 20 are apertured transversely to receive a cross bolt 24 which secures these elements in assembled relationship, whereby the sleeve 21 or engaging member is extended and retracted vertically with the jack foot 20.

Figure 2:
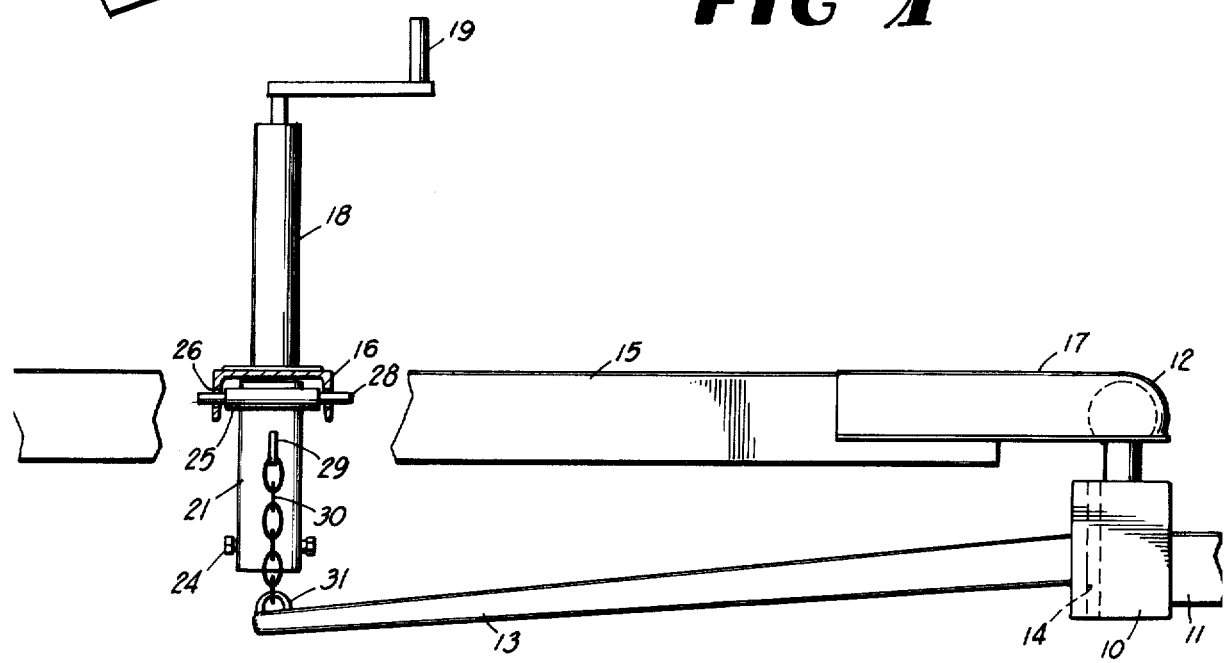
FIG. 2 is a side elevational view of the invention in FIG. 1, partly broken away and partly in section.

Near its top end and on opposite parallel side walls, the rectangular sleeve 21 has a pair of horizontal parallel sturdy tubes 25 welded thereto and extending somewhat fore and aft of the other pair of side walls of sleeve 21. The tubes 25 extend longitudinally of the axis of A-frame 15. When the jack foot 20 is retracted as in FIG. 4, the two tubes 25 register with cooperating openings 26 formed through the flanges 27 of channel cross member 16. When this condition prevails, rigid rods 28 are inserted through the bores of the tubes 25 and through the openings 26 with the rods fully spanning the channel member 16, as shown in FIGS. 1 and 2. As will be further described, the resulting rigid connection between the sleeve 21 and the trailer A-frame member 16 will relieve the jack 18 of the load transmitted through the transfer arms 13 during towing and the rigid connection can withstand the much greater loads which are developed during transport of the trailer.

The invention further comprises a pair of support hooks 29 fixed rigidly to the opposite sides of square sleeve 21 somewhat below the tubes 25. These hooks are coupled to the upper ends of link chains 30 whose lower ends are attached to eye members 31, FIG. 2, on the rear ends of spring load transferring arms 13.

Figure 3A:
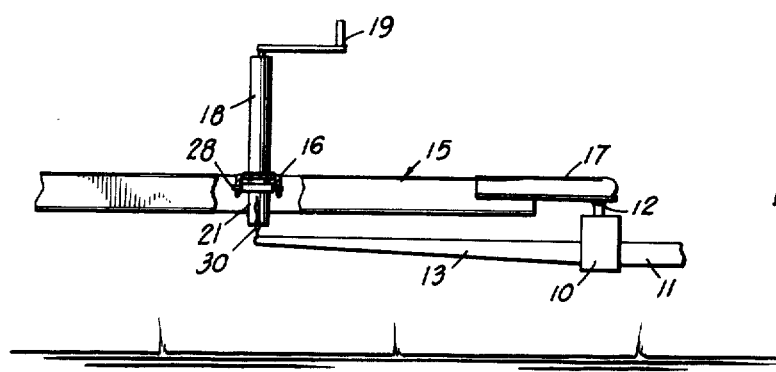
FIGS. 3A, 3B and 3C are partly diagrammatic side elevational views of the invention showing a sequence of operations on coupling a trailer to a towing vehicle and tensioning the trailer load transferring means by operation of a trailer-mounted jack.
Figure 3B:
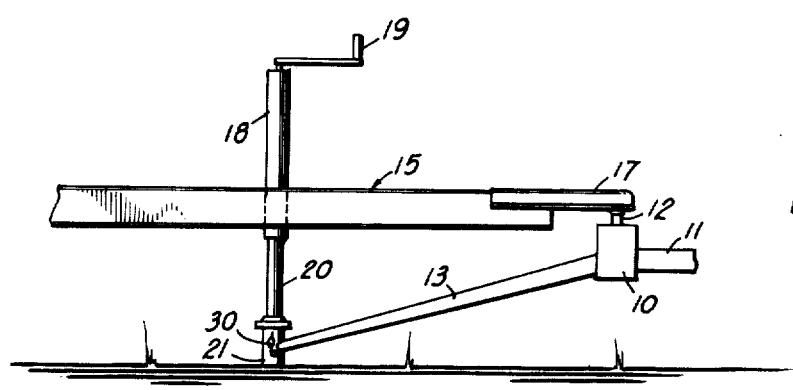
Figure 3C:
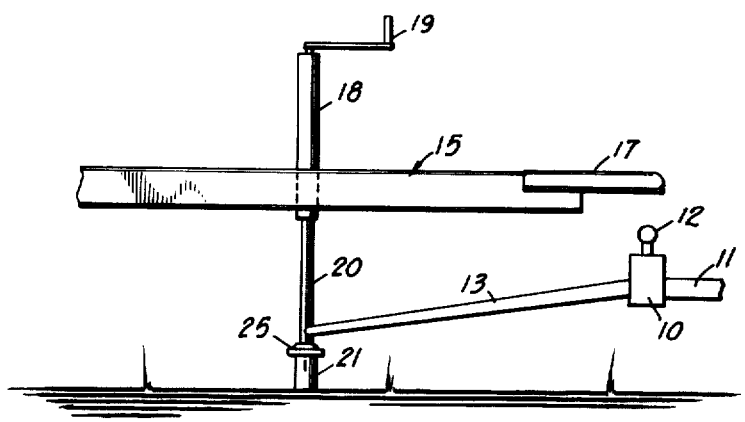
Figure 4:
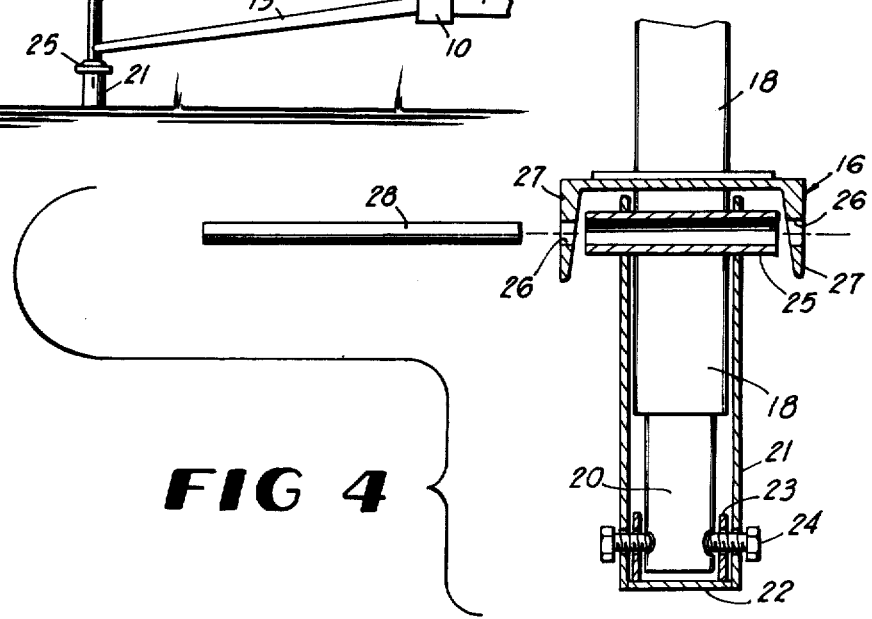
FIG. 4 is a partly exploded central vertical cross section through rigid supporting means which bear the full load transmitted through the load transferring spring arms during trailer transport.
Figure 5:
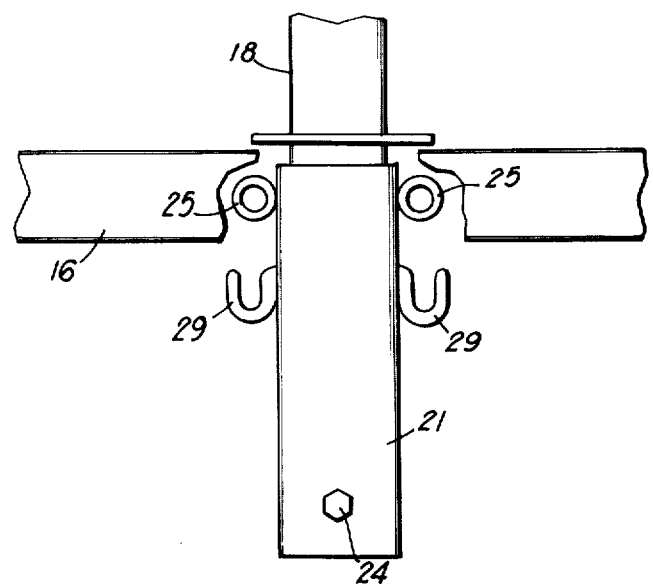
FIG. 5 is a front elevational view of the means in FIG. 4 taken at right angles thereto.

The operation of the invention, as above-described, can best be understood by reference to FIGS. 3A, 3B and 3C, sequentially. In FIG. 3C, the jack foot 20 is extended and the trailer A-frame 15 is being supported in a level attitude through the jack, with the bottom of sleeve 21 contacting the ground. The coupler 17 is above and free from connection with the hitch ball 12, and the load transferring spring arms 13 are relaxed and in their inclined positions free to swing horizontally but not vertically on the hitch head 10.

In FIG. 3B, the jack 18 has been operated to partly retract the jack foot 20, thereby lowering the coupler 17 into engagement with the hitch ball 12 of the towing vehicle so that coupling can be completed. The load transferring spring arms 13 are still relaxed and the chains 30 are connected between the eyes 31 and hooks 29 but are slack.

In FIG. 3A, the jack 18 is operated to further retract its foot 20 along with square sleeve 21 and, in so doing, the chains 30 become taut and pull up the spring arms 13 to tension them, the hitch ball 12 now counteracting this force and the spring arms being conditioned to transfer part of the trailer load to the front wheels of the towing vehicle. Also at this time, the tubes 25 carried by sleeve 21 are aligned with openings 26 and the rods 28 are inserted through the tubes and openings, as previously described. The inside diameter of the bores is such that the rods 28 are loosely received in the tubes. The jack foot 20 is now extended just enough to cause the ends of rods 28 to solidly engage the bottom sides of openings 26; and, thus also binding and frictionally locking the rods 28 in place in tubes 25, relieving the jack 18 of all weight. The much stronger support now provided through the elements 25, 27 and 28 bears the full force transmitted through the arms 13 and is fully capable of withstanding the greater forces through these arms during transport of the trailer. The relatively weaker jack which might fail under influence of these greater forces is effectively isolated from the forces and a very secure, simple and safe arrangement is created by the invention, which should now be fully understood by those skilled in the art to constitute the significant improvement over the prior art.

Figure 6:
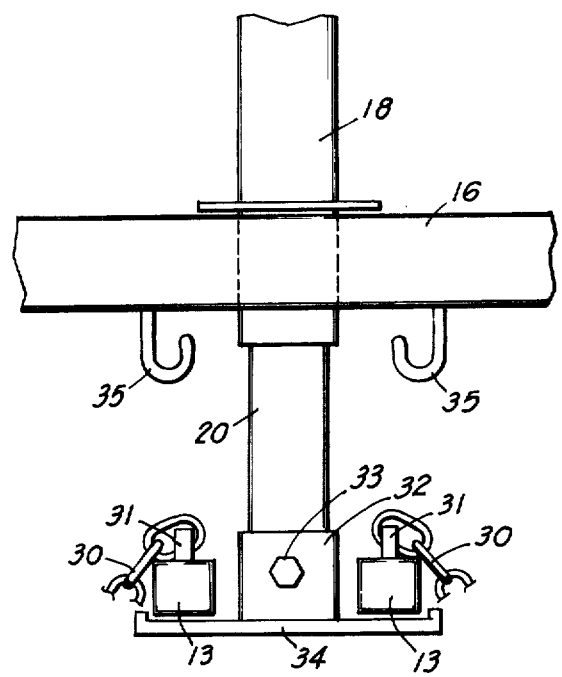
FIG. 6 is a similar view of a simplified embodiment of the invention.

FIG. 6 shows a simplified embodiment of the invention wherein a number of parts including the square sleeve or engaging member 21 are eliminated. Instead, the lower end of jack foot 20 has a short sleeve 32 bolted thereto at 33, the sleeve having a rigidly attached flat bottom plate 34 adapted to engage and lift the load transferring spring arms 13 at proper times. Hooks 35 for the chains 30 are attached directly to the channel cross member 16.

The mode of operation is essentially unchanged in the simplified embodiment. The jack is initially extended as in FIG. 3C to support the trailer A-frame and then the jack is retracted as in FIG. 3B to complete the coupling operation through the hitch ball 12 with the towing vehicle. Further retraction of the jack foot 20 as in FIG. 3A will elevate and tension the load transferring arms 13 through engagement by bottom plate 34. The chains 30 are attached to the hooks 35 and then the foot 20 is lowered free of the arms 13. The chains 30 now continue to tension the arms 13 and also form the solid support to the rigid channel member 16 during movement of the caravan in lieu of the elements 25, 27 and 28 in the preferred embodiment. The basic objectives of the invention are achieved in the simplified embodiment of FIG. 6, namely, relieving the jack 18 of the heavier loadings through the arms 13 during transport and then relying on much stronger means, the chains 30, to couple the arms rigidly to the member 16. As previously described, in the preferred embodiment, after retraction, the jack foot 20 is slightly extended to transfer the load from the jack to the chains 30.

Figure 7:
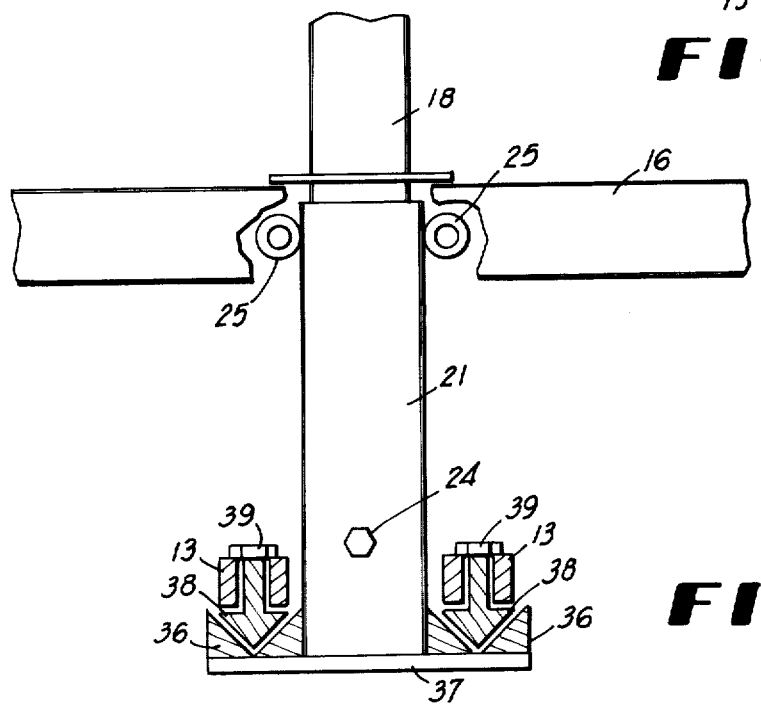
FIG. 7 is a similar view, partly in cross section, showing a modified form of the invention.

FIG. 7 shows a further and improved embodiment of the invention wherein the previously-described sleeve 21, tubes 25 and associated elements are employed. However, the chain hooks 29 are eliminated from the sleeve 21. The spring arms 13 are now directly engaged by resting in saddles or seats 36 attached to an extended flat base plate 37 on the lower end of sleeve 21. Blocks 38 carrying friction brake surfaces are attached to spring arms 13 by nut and bolt means 39.

The mode of operation is identical to the preferred embodiment, FIGS. 1-5, with the following exception. Instead of attaching spring arms 13 to the engaging member or sleeve 21 through hooks and chains, the arms 13 are engaged through the foot plate 37, saddles 36 and the brake blocks 38 and bolt means 39. When the towing vehicle turns or moves relative to the trailer, spring bars 13 shift longitudinally fore and aft, but this movement is resisted frictionally by the action of the brake blocks 38 in the saddles 36. This, in turn, resists relative movement between the towing vehicle and trailer, dampening out sway and fishtailing of the trailer relative to the towing vehicle. Thus, an effective sway control device is also provided by the embodiment of the invention in FIG. 7.

It is to be understood that the forms of the invention herewith shown and described are to be taken as preferred examples of the same, and that various changes in the shape, size and arrangement of parts may be resorted to, without departing from the spirit of the invention or scope of the subjoined claims.

I claim:

1. In a load transferring trailer hitch having a resilient member which is tensioned to distribute trailer weight through the hitch on all wheels of the towing vehicle, the improvement comprising a jack means on the trailer having an engaging part which engages the resilient member to apply tension to the latter when the jack means is operated in one direction with the trailer and towing vehicle coupled through the hitch, and means interconnecting the resilient member and trailer and relieving the jack means of substantial forces transmitted through said resilient member during towing of the trailer.

2. In a load transferring trailer hitch as defined in claim 1, and the engaging part of the jack means comprising an element coupled to an extensible and retractable foot of the jack means and moving therewith, and said engaging part comprising cooperating non-yielding connecting means on said element and said trailer.

3. In a load transferring trailer hitch as defined in claim 2, and said copperating non-yielding connecting means comprising rigid apertured members of the trailer and on said element, and a rod-like element engaging through said apertured members to releasably lock them in supportive relationship.

4. In a load transferring trailer hitch as defined in claim 3, said rod-like elements being of such a diameter, with respect to said rigid apertured members that they are readily slideable in said member when said jack means is in an upper position but binds and are frictionally held by said apertured members when said jack means is in a more lowered position.

5. In a load transferring trailer hitch as defined in claim 3, said rigid apertured members comprising an apertured cross member on the trailer draft tongue and a tube on said element alignable with the apertures of the cross member.

6. In a load transferring trailer hitch as defined in claim 1, and said interconnecting means comprising a non-yielding tension element connected with said resilient member and directly connectable with the trailer.

7. In a load transferring trailer hitch as defined in claim 6, and said tension element comprising a chain connected with the resilient member, and a chain hook on said trailer connectable with a link of said chain.

8. In a load transferring trailer hitch as defined in claim 2, the improvement further comprising a non-yielding tension element interconnecting said resilient member and said engaging part.

9. In a load transferring trailer hitch as defined in claim 8, and said non-yielding tension element is a chain.

10. In a load transferring trailer hitch as defined in claim 1, and the improvement further comprising cooperating friction elements on the engaging part and resilient member through which said tension is applied to the resilient member, and said friction elements frictionally resisting longitudinal movements of the resilient member relative to said engaging part during turning and movement of the towing vehicle relative to the trailer.

11. In a load transferring trailer hitch as defined in claim 10, and a pair of resilient members on opposite sides of the jack means longitudinally of the trailer and towing vehicle, and said friction elements being paired on the engaging part and said resilient members, whereby a friction sway control means is provided between the towing vehicle and trailer.

12. In a load transferring trailer hitch as defined in claim 1, and the improvement further comprising cooperating bearing elements on the engaging part and resilient member through which said tension is applied to the resilient member, and said bearing elements facilitating longitudinal movements of the resilient member relative to said engaging part during turning or movement of the towing vehicle relative to the trailer.

13. In a load transferring trailer hitch as defined in claim 12, and a pair of resilient members on opposite sides of the jack means longitudinally of the trailer and towing vehicle, and said bearing elements being paired on the engaging part and said resilient members.

14. In a load transferring trailer hitch as defined in claim 1, said jack means being a substantially vertical axis jack having an extensible and retractable foot, said engaging part being secured to said foot for movement therewith.

15. In a load transferring trailer hitch as defined in claim 14, and said engaging part being a sleeve member coupled to said foot telescopically, and a non-yielding tension element interconnecting said sleeve member and said resilient member.

16. In a load transferring trailer hitch as defined in claim 1, and said jack means comprising a substantially vertically extensible and retractable jack with said engaging part attached to the foot of the jack and being directly connected with said resilient member to apply tension to it when the jack foot is retracted and separating from supportive engagement with the resilient member when said interconnecting means is engaged with the resilient member and said trailer.

* * * * *